United States Patent [19]

Kitagawa

[11] Patent Number: 4,796,212

[45] Date of Patent: Jan. 3, 1989

[54] LOAD CELL TYPE, WEIGHT-MEASURING DEVICE

[75] Inventor: Tohru Kitagawa, Mishima, Japan

[73] Assignee: Tokyo Electric Co., Ltd., Tokyo, Japan

[21] Appl. No.: 799,122

[22] Filed: Nov. 18, 1985

[30] Foreign Application Priority Data

Nov. 29, 1984 [JP] Japan .................. 59-252392

[51] Int. Cl.⁴ .................. G01K 19/00; G06F 15/20
[52] U.S. Cl. .................. 364/571.03; 364/581; 364/567; 177/25.11; 177/211; 73/862.67
[58] Field of Search ............ 364/571, 567, 581, 557, 364/466; 177/25, 26, 210 FP; 73/862.65, 862.67

[56] References Cited

U.S. PATENT DOCUMENTS

| | | | |
|---|---|---|---|
| 4,366,874 | 1/1983 | Pidoux et al. | 177/25 |
| 4,399,515 | 8/1983 | Gross | 364/557 |
| 4,490,803 | 12/1984 | Briggs | 364/571 |
| 4,592,002 | 5/1986 | Bozarth et al. | 364/571 |
| 4,639,872 | 1/1987 | McHale et al. | 364/567 |

*Primary Examiner*—Parshotam S. Lall
*Assistant Examiner*—Ellis B. Ramirez
*Attorney, Agent, or Firm*—Frishauf, Holtz, Goodman & Woodward

[57] ABSTRACT

A load cell type, weight-measuring device includes a load cell for generating an electrical signal corresponding to an applied weight, an analog-to-digital converting circuit for converting an output signal from the load cell to a digital data, and a data processing unit for generating weight data on the basis of output data from the A/D converting circuit. This weight-measuring device further has a memory in which data indicative of the temperature characteristic of the output signal of the load cell is stored, and a temperature sensor for detecting the temperature of the load cell and generating a corresponding output signal. The data processing unit corrects the output data from the A/D converting circuit on the basis of the output signal from the temperature sensor and the data in the memory.

5 Claims, 2 Drawing Sheets

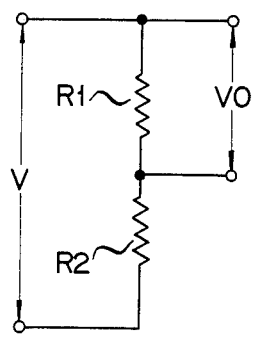
FIG. 2
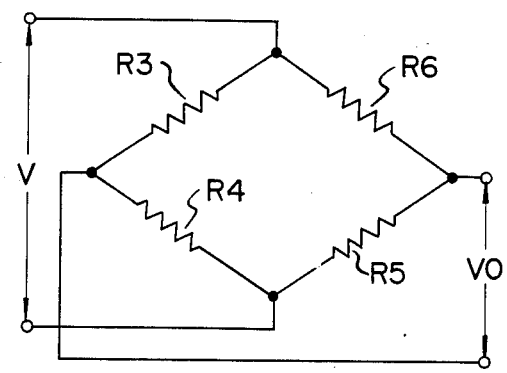
FIG. 3
FIG. 4
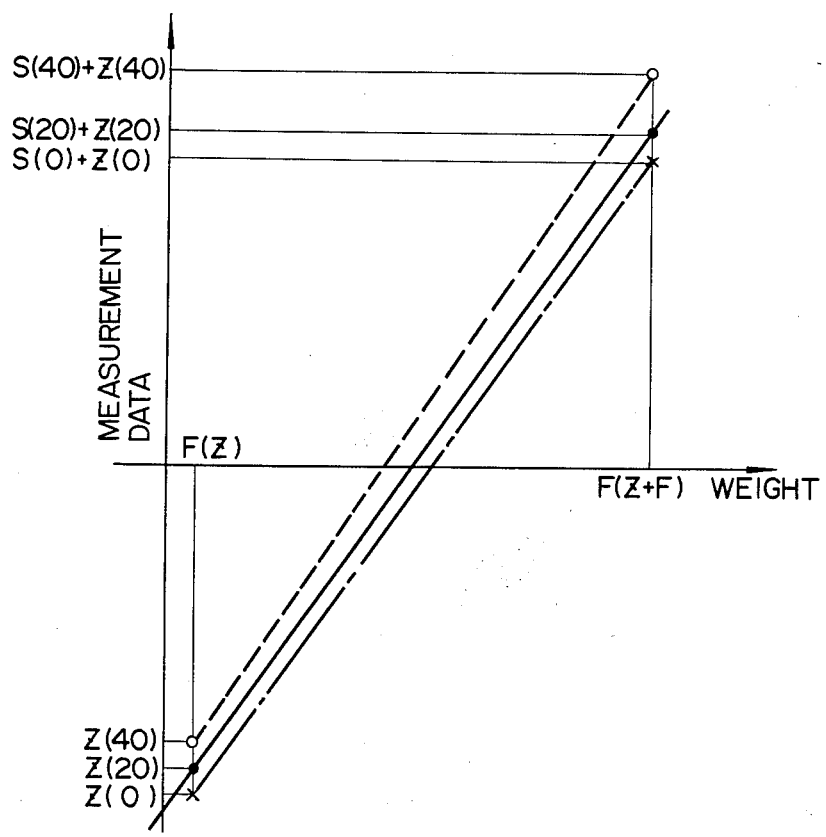

LOAD CELL TYPE, WEIGHT-MEASURING DEVICE

BACKGROUND OF THE INVENTION

The present invention relates to a load cell type, weight-measuring device in which a distorted beam, which is deformed through receipt of a weight, is converted to an electrical signal to thereby obtain weight data.

In general, in load cells, a zero point voltage (output voltage of a load cell when an effective weight of load is not applied) and a span (differential voltage between the zero point voltage and an output voltage when a rated weight is applied) change when an ambient temperature changes. Therefore, it is necessary to correct the output voltage of the load cell in accordance with temperature change. Temperature compensation for the zero point voltage is executed by interposing a variable resistor (or variable resistors), having particular temperature characteristics, in one side (or two sides) of a bridge circuit having four strain gauges, thereby attaining a bridge balance at substantially any temperature. On one hand, temperature compensation for the span is executed by interposing a variable resistor, having particular temperature characteristics, in the input side of the bridge circuit, thereby changing the input voltage applied to the bridge circuit, in response to the temperature change, and keeping the span constant. On the other hand, to execute temperature compensation for the zero point voltage the interposition of a variable resistor having a predetermined temperature characteristic is required in the bridge circuit, resulting in an increase in the number of manufacturing steps. Also, it is very troublesome to check whether this variable resistor has an accurate resistance value or not. Further, to execute temperature compensation for the span, interposition of a resistor is needed in the input side of the bridge circuit; therefore, the input voltage applied across the bridge circuit decreases as compared with the actual input voltage, causing the rated output voltage to be lowered.

SUMMARY OF THE INVENTION

It is an object of the present invention to provide a load cell type, weight-measuring device which can effectively execute temperature compensation for an output voltage of a load cell without need of connecting a resistor, for temperature compensation, to a bridge circuit.

This object is accomplished by a load cell type, weight-measuring device comprising a load cell which generates an electrical signal proportional to an applied weight, an analog-to-digital (A/D) converting circuit for converting an output signal from the load cell to digital data, a memory in which data indicative of a temperature characteristic of the output signal of the load cell is stored, a temperature sensor for generating an output signal corresponding to the temperature of the load cell, and a data processing circuit for generating digital data, as weight data, derived by correcting the digital data from the A/D converting circuit on the basis of the output signal of the temperature sensor and the data in the memory.

According to the present invention, the output signal of the load cell is corrected on the basis of the output signal of the temperature sensor and the data in the memory; therefore, the weight data, after completion of the effective temperature correction, can be derived without connecting a resistor for temperature correction to the bridge circuit.

BRIEF DESCRIPTION OF THE DRAWINGS

FIGS. 2 and 3 show examples of the practical circuits of a temperature sensor used in the weight-measuring device shown in FIG. 1, respectively; and FIG. 4 is a characteristic diagram showing the relation between the weight applied to the load cell shown in FIG. 1 and the measurement data from an A/D converting circuit.

DETAILED DESCRIPTION OF THE PREFERRED EMBODIMENT

Figure 1:
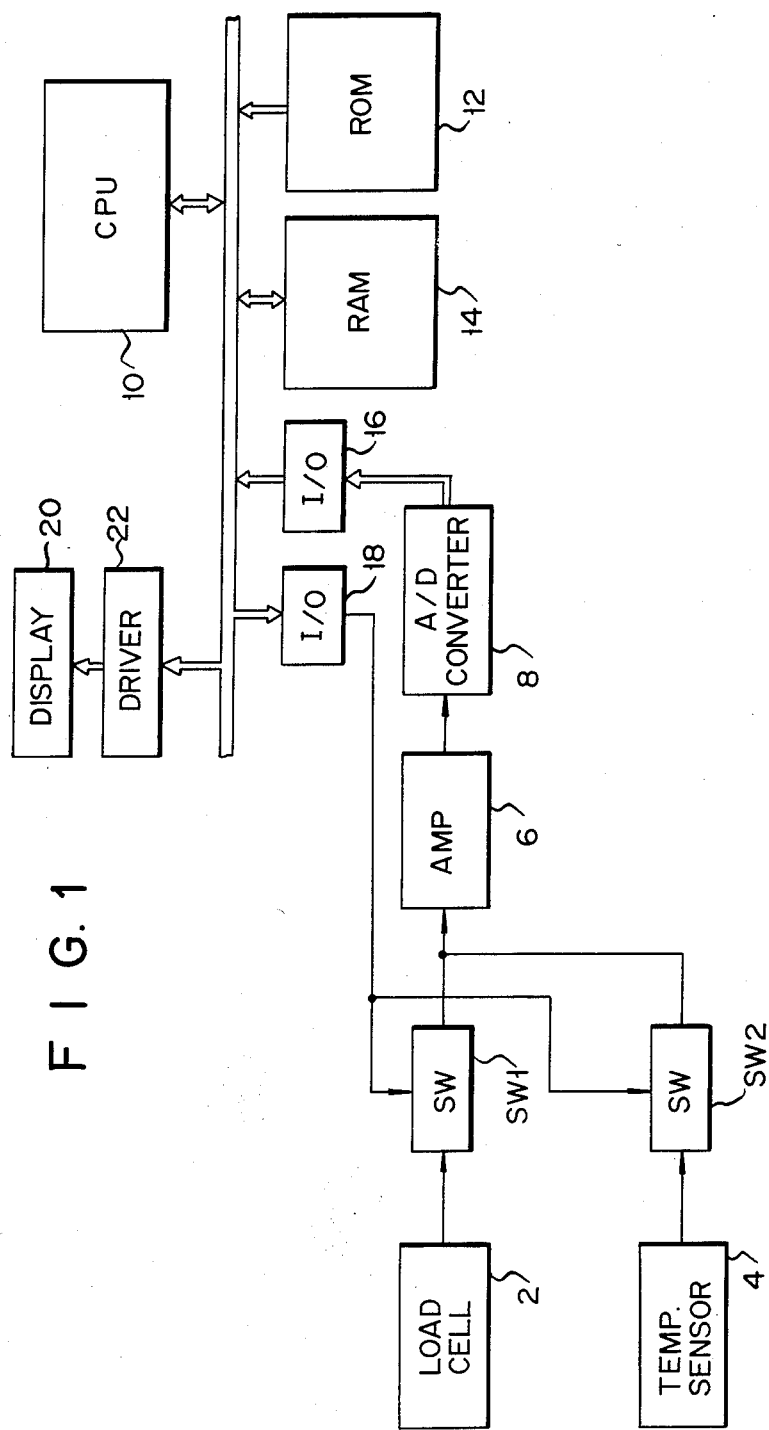
FIG. 1 is a block diagram of a load cell type, weight-measuring device according to an embodiment of the present invention.

A load cell type, weight-measuring device according to one embodiment of the present invention, that shown in FIG. 1, includes a load cell section 2, a temperature sensor 4, an amplifier 6 connected to the load cell section 2 and the temperature sensor 4 through switches SW1 and SW2, respectively, an analog-to-digital (A/D) converting circuit 8 for converting an output signal from the amplifier 6 to a digital signal, and a central processing unit (CPU) 10 for processing a digital signal from the A/D converting circuit 8. The CPU 10 is also connected to both a read only memory (ROM) 12 in which a program executed by the CPU 10 and data indicative of the temperature characteristic of an output voltage of the load cell section 2 are stored, and a random access memory (RAM) 14 in which digital data corresponding to the output voltages of the load cell section 2 and temperature sensor 4 is stored. Further, the digital data from the A/D converting circuit 8 is supplied to the CPU 10 through an I/O port 16. A switch control signal from the CPU 10 is supplied to the switches SW1 and SW2 through an I/O port 18. A display unit 20 is also connected to the CPU 10 through a display driver 22.

The load cell section 2 is constituted of a bridge circuit including four strain gauge resistors (not shown). The temperature sensor 4 is disposed on the nondistortion portion of a beam member (not shown) of the load cell section 2 and supplies an output voltage corresponding to the temperature of the member to the amplifier 6 through the switch SW2.

FIG. 2 shows an example of the temperature sensor 4. This sensor 4 has resistors R1 and R2 connected in series between input voltage terminals to which an input voltage V is applied. The resistor R1 has a predetermined temperature coefficient, and its resistance varies in accordance with a change in temperature. The resistance value of the resistor R2, on the other hand, hardly changes as a result of temperature change. Due to this, an output voltage VO, which varies in proportion to temperature change, is generated across the resistor R1.

FIG. 3 shows another example of the temperature sensor 4. This sensor 4 is constituted of a bridge circuit including resistors R3 to R6. The resistors R3 and R5, connected to the opposite sides of the bridge circuit, have predetermined temperature coefficients. Resistance values of the resistors R4 and R6 are constant irrespective of a change in temperature. Resistances of the resistors R3 and R5 vary in accordance with temperature change, so that the output voltage VO of the bridge circuit changes in proportion to temperature change.

As shown in the table below, the following data are stored in the ROM 12: zero point data Z(T1), Z(T2) and Z(T3), and span data S(T1), S(T2) and S(T3) which are generated from the A/D converting circuit 8 in correspondence to the zero point voltages and spans generated from the load cell 2 at the arbitrarily set reference temperatures T1, T2 and T3; and temperature data T(T1), T(T2) and T(T3) which are generated from the A/D converting circuit 8 in correspondence to the output voltages of the temperature sensor 4 at the reference temperatures T1, T2 and T3.

TABLE 1

| Data | Temperature | | |
|---|---|---|---|
|  | T1 | T2 | T3 |
| Zero Point Data | Z(T1) | Z(T2) | Z(T3) |
| Span Data | S(T1) | S(T2) | S(T3) |
| Temperature Data | T(T1) | T(T2) | T(T3) |

It is now assumed that the reference temperature points T1, T2 and T3 are respectively set to 0° C., 20° C. and 40° C., and that this weight-measuring device is designed so that a desired operation characteristic can be achieved at the set standard temperature of 20° C. Under this assumption and in the state in which the load cell 2 is respectively set to 0° C., 20° C. and 40° C., the zero point voltages and spans from the load cell 2 are converted to digital data by the A/D converting circuit 8, so that zero point data Z(0), Z(20) and Z(40), and span data S(0), S(20) and S(40) are obtained, and these six data are stored in the ROM 12. At the same time, temperature data T(0), T(20) and T(40), obtained by converting, through the A/D converting circuit 8, output voltages from the temperature sensor 4 to digital data, are stored in the ROM 12. The CPU 10 calculates zero point coefficients ZC1, ZC2 and span coefficients SC1, SC2 on the basis of those data in accordance with the following equations, and stores them into the RAM 14.

$$ZC1 = \frac{Z(20) - Z(0)}{T(20) - T(0)} \quad (1)$$

$$ZC2 = \frac{Z(20) - Z(40)}{T(20) - T(40)} \quad (2)$$

$$SC1 = \frac{S(20) - S(0)}{T(20) - T(0)} \quad (3)$$

$$SC2 = \frac{S(20) - S(40)}{T(20) - T(40)} \quad (4)$$

The zero point data Z(X) and the span data S(X), at a temperature X between 0° C. and 20° C., are given by the following equations.

$$\begin{aligned} Z(X) &= Z(20) - \frac{Z(20) - Z(0)}{T(20) - T(0)} \times \{T(20) - T(X)\} \\ &= Z(20) - ZC1 \cdot \{T(20) - T(X)\} \end{aligned} \quad (5)$$

$$\begin{aligned} S(X) &= S(20) - \frac{S(20) - S(0)}{T(20) - T(0)} \times \{T(20) - T(X)\} \\ &= S(20) - SC1 \cdot \{T(20) - T(X)\} \end{aligned} \quad (6)$$

Similarly, the zero point data Z(Y) and span data S(Y), at a temperature Y between 20° C. and 40° C., are given by the following equations.

$$\begin{aligned} Z(Y) &= Z(20) + \frac{Z(40) - Z(20)}{T(40) - T(20)} \times \{T(Y) - T(20)\} \\ &= Z(20) + ZC2 \cdot \{T(Y) - T(20)\} \end{aligned} \quad (7)$$

$$\begin{aligned} S(Y) &= S(20) + \frac{S(40) - S(20)}{T(40) - T(20)} \times \{T(Y) - T(20)\} \\ &= S(20) + SC2 \cdot \{T(Y) - T(20)\} \end{aligned} \quad (8)$$

FIG. 4 shows the relation between the weight applied to the weight-measuring device shown in FIG. 1 and the measurement data from the A/D converting circuit 8. In the diagram, F(Z) denotes a weight when no load is applied, F(Z+F) indicates a rated weight, and an alternate long and short dash line, a solid line, and a broken line, respectively, represent weight-measuring characteristics at 0° C., 20° C. and 40° C.

When a weight F(W) is applied to the load cell 2 at temperatures X (0° C.$\leq$X$\leq$20° C.) and Y (20° C.$\leq$Y$\leq$40° C.) and 20° C., the output data C(X), C(Y) and C(20), which are generated from the A/D converting circuit 8, are given by the following equations.

$$C(X) = \frac{S(X)}{F(Z + F) - F(Z)} \{F(W) - F(Z)\} + Z(X) \quad (9)$$

$$C(Y) = \frac{S(Y)}{F(Z + F) - F(Z)} \{F(W) - F(Z)\} + Z(Y) \quad (10)$$

$$C(20) = \frac{S(20)}{F(Z + F) - F(Z)} \{F(W) - F(Z)\} + Z(20) \quad (11)$$

From equations (9) and (11), the following equation is derived.

$$C(20) = \frac{S(20)}{S(X)} \{C(X) - Z(X)\} + Z(20) \quad (12)$$

From equations (10) and (11), the following equation is obtained.

$$C(20) = \frac{S(20)}{S(Y)} \{C(Y) - Z(Y)\} + Z(20) \quad (13)$$

In equation (12), Z(X) and S(X) are output data determined in accordance with the temperature data T(X) corresponding to the output voltage generated from the temperature sensor 4 at temperature X as shown in equations (5) and (6), respectively. In so far as output data, C(X) from the A/D converting circuit 8 corresponds to the weight F(W) at temperature X, the temperature compensated data C(20) is obtained by calculating equation (12).

In equation (13), Z(Y) and S(Y) are also determined by the temperature data T(Y), as shown in equations (7) and (8), respectively. In addition, C(Y) is data derived from the A/D converting circuit 8 corresponding to the weight F(W) at temperature Y. Therefore, the temperature compensated data C(20) is obtained by calculating equation (13) on the basis of the data Z(20), S(20), and T(20) read out from the ROM 12, the coefficient data ZC2 and SC2 read out from the RAM 14, and the data C(Y) and T(Y) derived from the A/D converting circuit 8 upon measurement.

In the measuring operation, the CPU 10 sends switch control signals to the switches SW1 and SW2 to alternately close them. When the switch SW1 is closed, the output voltage from the load cell 2 is supplied to the A/D converting circuit 8 through the amplifier 6, so that the corresponding digital data C(Q) is supplied to the CPU 10 through the I/O port 16. The CPU 10 stores the received digital data C(Q) into a predetermined memory location in the RAM 14. When the switch SW2 is closed, the output voltage from the temperature sensor 4 is supplied to the A/D converting circuit 8, so that the corresponding temperature data T(Q) is supplied to the CPU 10 through the I/O port 16. The CPU 10 stores the received temperature data T(Q) into another predetermined memory location in the RAM 14. After detecting that the digital data C(Q) and temperature data T(Q) has stabilized, the CPU 10 checks to see if the temperature data T(Q) is larger than T(20) or not, namely, if the measured temperature Q is higher than 20° C. or not. When it is detected that $T(0) \leq T(Q) \leq T(20)$, the CPU 10 calculates the zero point data Z(Q) and S(Q) in accordance with equations (5) and (6). Thereafter, the CPU 10 uses the data Z(Q) and S(Q) as Z(X) and S(X), respectively, and uses the data C(Q), read out from the RAM 14, as C(X), and calculates equation (12), thereby to derive corrected data. Then, the CPU 10 supplies weight data corresponding to this corrected data to the display unit 20 for display.

On the contrary, when it is detected that $T(40) \geq T(Q) > T(20)$, the CPU 10 calculates the zero point data Z(Q) and S(Q) in accordance with equations (7) and (8), and then calculates equation (13) using these calculated data Z(Q) and S(Q) and the data C(Q) stored in the RAM 14, thereby obtaining corrected data. Weight data corresponding to this corrected data is displayed on the display unit 20.

Although the present invention has been described with respect to one embodiment, the present invention is not limited to only this embodiment. For example, although three measurement temperature points are used in the above-mentioned embodiment, the number of measurement temperature points is not limited to three but may be arbitrarily set.

In addition, any data may be stored in the ROM 12 if it represents the temperature characteristic of the output voltage of the load cell 2. For example, in place of span data, data corresponding to the output voltage of the load cell when the rated weight is applied may be stored in the ROM 12.

Further, it is possible to connect the temperature sensor 4 to the CPU 10 through an I/O port.

What is claimed is:

1. A load cell type, weight-measuring device, comprising:

load cell means for generating an electrical signal corresponding to an applied weight;

analog-to-digital converting means for converting an output signal from said load cell means to a digital data;

read only memory means in which temperature data indicative of a temperature characteristic of the output signal of said load cell means is stored;

said read only memory means storing zero point data obtained at least at first and second reference measurement temperatures, and span data obtained at least at said first and said second reference measurement temperatures;

temperature sensing means for detecting the temperature of said load cell means and generating a corresponding output signal; and processing means coupled to said analog-to-digital converting means and said read only memory means, for deriving digital data, as weight data, from the digital data from said analog-to-digital converting means in accordance with the output signal of said temperature sensing means and the temperature data in said read only memory means;

said processing means including means for generating a first characteristic curve defined by the zero point data and the span data both of which data are obtained at said first reference measurement temperature, means for generating a second characteristic curve defined by the zero point data and the span data both of which data are obtained at said second reference measurement temperature, and means for generating a new characteristic curve corresponding to an actual measurement temperature between said first and said second reference measurement temperatures wherein the processing means interpolates the new characteristic curve from said first and said second characteristic curves when the actual measurement temperatures lies between said first and said second reference measurement temperatures.

2. A weight-measuring device according to claim 1, wherein said processing means includes means for producing a switch control signal and switching means for selectively connecting said load cell means and temperature sensing means to said analog-to-digital converting means in response to said switch control signal.

3. A weight-measuring device according to claim 1, wherein said processing means includes (a) means for calculating, at said actual measurement temperature, zero point data (Z(X)) according to the relation $$Z(X) = Z(T2) - [Z(T2) - Z(T1)][T(T2) - T(X)]/[T(T2) - T(T1)]$$

wherein Z(T2) is the zero point data obtained at the second reference measurement temperature, Z(T1) is the zero point data obtained at the first reference measurement temperature, T(T2) is temperature data in said read only memory means corresponding to the second reference measurement temperature, T(T1) is temperature data corresponding to the first reference measurement temperature, and T(X) is temperature data corresponding to the actual measurement temperature;

(b) means for calculating, at said actual measurement temperature, span data (S(X)) according to the relation $$S(X) = S(T2) - [S(T2) - S(T1)][T(T2) - T(X)]/[T(T2) - T(T1)]$$

wherein S(T2) is the span data obtained for the second reference measurement temperature, S(T1) is the span data obtained for the first reference measurement temperature; and (c) means for calculating weight data (C(T2)) at said second reference measurement temperature according to the relation $$C(T2) = S(T2)[C(X) - Z(X)]/S(X) + Z(T2)$$

wherein C(X) is actual weight data obtained at the actual measurement temperature (T(X)=X°C.).

4. A weight-measuring device according to claim 1, having a display unit for display of the weight data from said processing means.

5. A weight-measuring device according to claim 4, wherein said processing means includes means for producing a switch control signal and switching means for selectively connecting said load cell means and temperature sensing means to said analog-to-digital converting means in response to said switch control signal.

* * * * *